United States Patent
Haggard

(10) Patent No.: US 6,824,102 B2
(45) Date of Patent: Nov. 30, 2004

(54) PARAFOIL MID-AIR RETRIEVAL

(76) Inventor: Roy A. Haggard, 29335 Jarrel Ct., Nuevo, CA (US) 92567

( * ) Notice: Subject to any disclaimer, the term of this patent is extended or adjusted under 35 U.S.C. 154(b) by 76 days.

(21) Appl. No.: 10/383,362

(22) Filed: Mar. 10, 2003

(65) Prior Publication Data
US 2004/0195458 A1 Oct. 7, 2004

(51) Int. Cl.$^7$ ............................................. B64C 25/00
(52) U.S. Cl. ............................ 244/110 F; 244/137.1; 244/137.3; 244/142
(58) Field of Search ...................... 244/110 F, 137.1, 244/137.3, 137.4, 142

(56) References Cited

U.S. PATENT DOCUMENTS

| | | | | |
|---|---|---|---|---|
| 3,207,480 A | * | 9/1965 | Fulton, Jr. | 258/1.2 |
| 3,389,880 A | * | 6/1968 | Ferguson | 244/137.1 |
| 4,884,769 A | * | 12/1989 | Snead | 244/145 |
| 6,131,856 A | * | 10/2000 | Brown | 244/152 |
| 6,631,872 B1 | * | 10/2003 | Haggard | 244/152 |

OTHER PUBLICATIONS

Parafoil Mid–Air Retrieval, a Proprietary Paper by Vertigo, Inc., P.O. Box 117 Lake Elsinore CA 92531–0117 tel 909 674 0604 The is Descriptive of the Attached Application for a Parafoil Mid–Air Retrieval.

* cited by examiner

Primary Examiner—J. Woodrow Eldred
(74) Attorney, Agent, or Firm—Frank C. Price

(57) ABSTRACT

The capture of payloads carried by a descending parafoil is facilitated by the use of a trailing line from the parafoil that is snagged by a hook on a recovery line from a helicopter. The trailing line can be more easily snagged by the use of a drogue at its end to facilitate the extension of the trailing line. The trailing line can take the form of a loop extending from the parafoil canopy. The trailing line can actuate a slider to collapse the parafoil's suspension lines and canopy for easier handling by the capturing helicopter. Cutters can be installed on the lines holding the load to cut those lines when the recovery line pulls to hoist the load, thus separating the parafoil from the load as the load is lifted by the helicopter.

3 Claims, 8 Drawing Sheets

PARAFOIL MID-AIR RETRIEVAL

No Federally sponsored research funds were used in the creation of the material of this application.

BACKGROUND OF THE INVENTION

Mid-air Retrieval (MAR) has long been used to recover items returning from space. Both fixed-wing aircraft and helicopters have been used to snag a parachute or a parafoil and the load. Improvements have been needed to simplify the overall system and to accommodate larger payloads.

SUMMARY OF THE INVENTION

This is the invention of a mid-air retrieval system (MARS) using a parafoil that, with its forward movement, is adaptable to a new method of capture by a helicopter and to the capture of heavier payloads. The invention is a method and equipment for the capture of a line trailing from the descending parafoil by a hook on another line from a helicopter. In one embodiment the parafoil is cut away as the line from the helicopter acquires the load. The force suspending the payload by the trailing line provides an actuation at the lower end of the line to cause a cutting away of the parafoil suspension lines from the load. Thus, the helicopter is unencumbered of the parafoil.

A slider assembly encompassing the parafoil suspension lines can be actuated by the helicopter's pull on the trailing line to cause a collapsing of the suspension lines and the canopy. This facilitates the handling of the collapsed parafoil by the helicopter and reduces cost when both the parafoil and the load can be recovered.

One objective of capture is that it not place too high a sudden load on either the load support lines or the helicopter. The dangling, trailing pickup line allows gradual takeover of the payload motion by the helicopter.

Another objective of the invention is the elimination of the winch installed in the helicopter for previous MAR methods. With this invention the relative velocity between the helicopter and the parafoil is so low that a winch is not necessary as the load is transferred from the parafoil to the helicopter.

In all cases a line trails behind the parafoil canopy with its ** forward motion rather than above as in the case of a parachute. A capturing hook dangled from the helicopter snags the line. A drogue can be used on the trailing line to give it a more horizontal slope, thus making the line an easier target for capture.

In one embodiment the hook at the end of the capturing line is made up of tines that are controlled to be actuated for a firm grasp of the trailing line.

DETAILED DESCRIPTION

Figure 1:
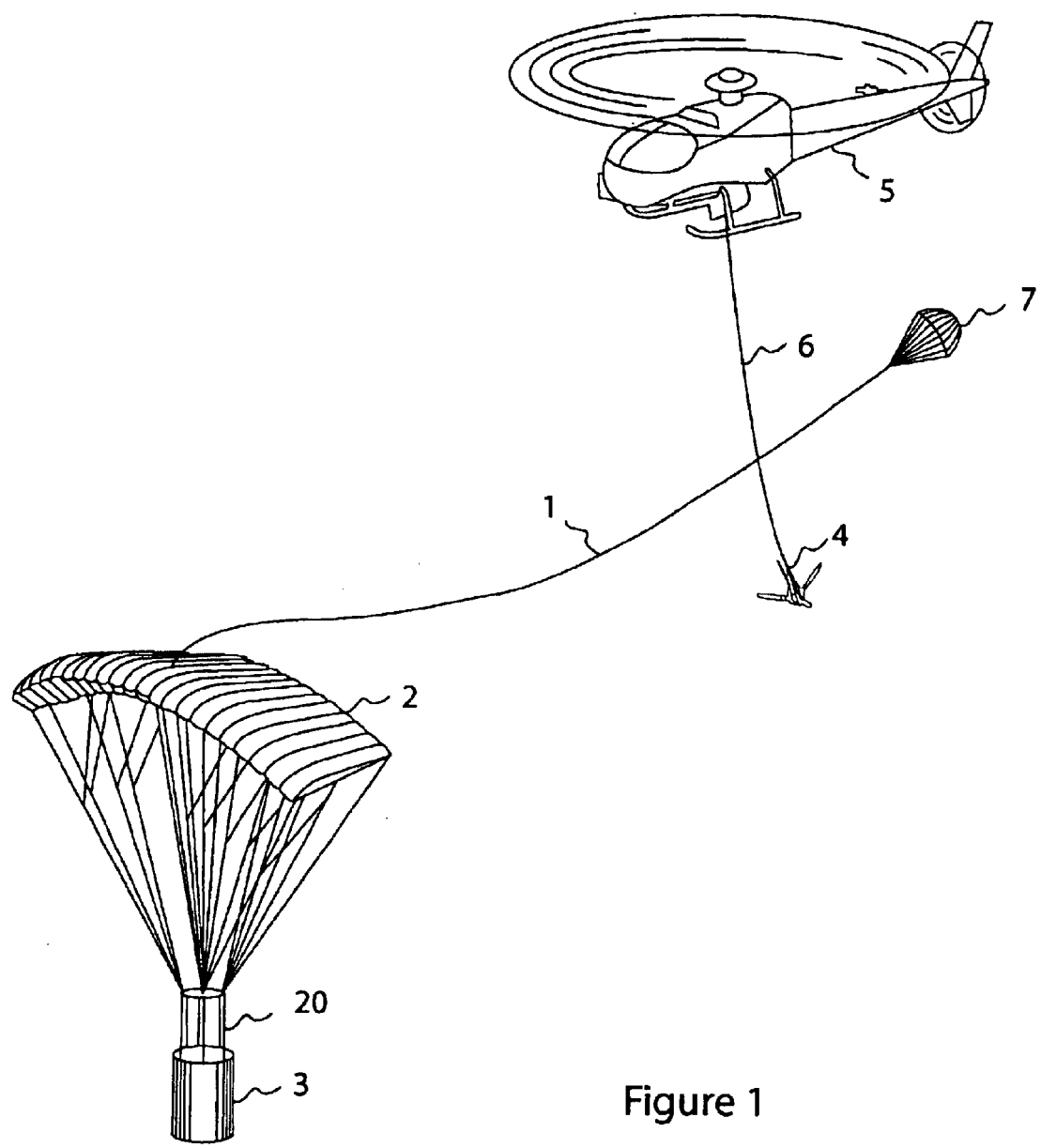
FIG. 1 shows the capture of a descending parafoil by contact with its trailing line.

FIG. 1 depicts the basic concept of this invention, the retrieval line 1 trailing from the parafoil canopy 2 that is carrying the payload 3 with its payload risers 20. The forward motion of the parafoil 2 provides the rearward streaming of the retrieval line 1 where it can be reached by the engagement hook 4 attached to the helicopter 5 by the line 6. A drogue parachute 7 can be attached to line 1 to accentuate the line's rearward streaming making it a more stabilized and visible target for the helicopter pilot. After the engagement hook 4 captures the retrieval line 1, the helicopter 5 flies forward toward the parafoil 2 and upward until the payload weight is transferred to the helicopter 5.

Figure 2:
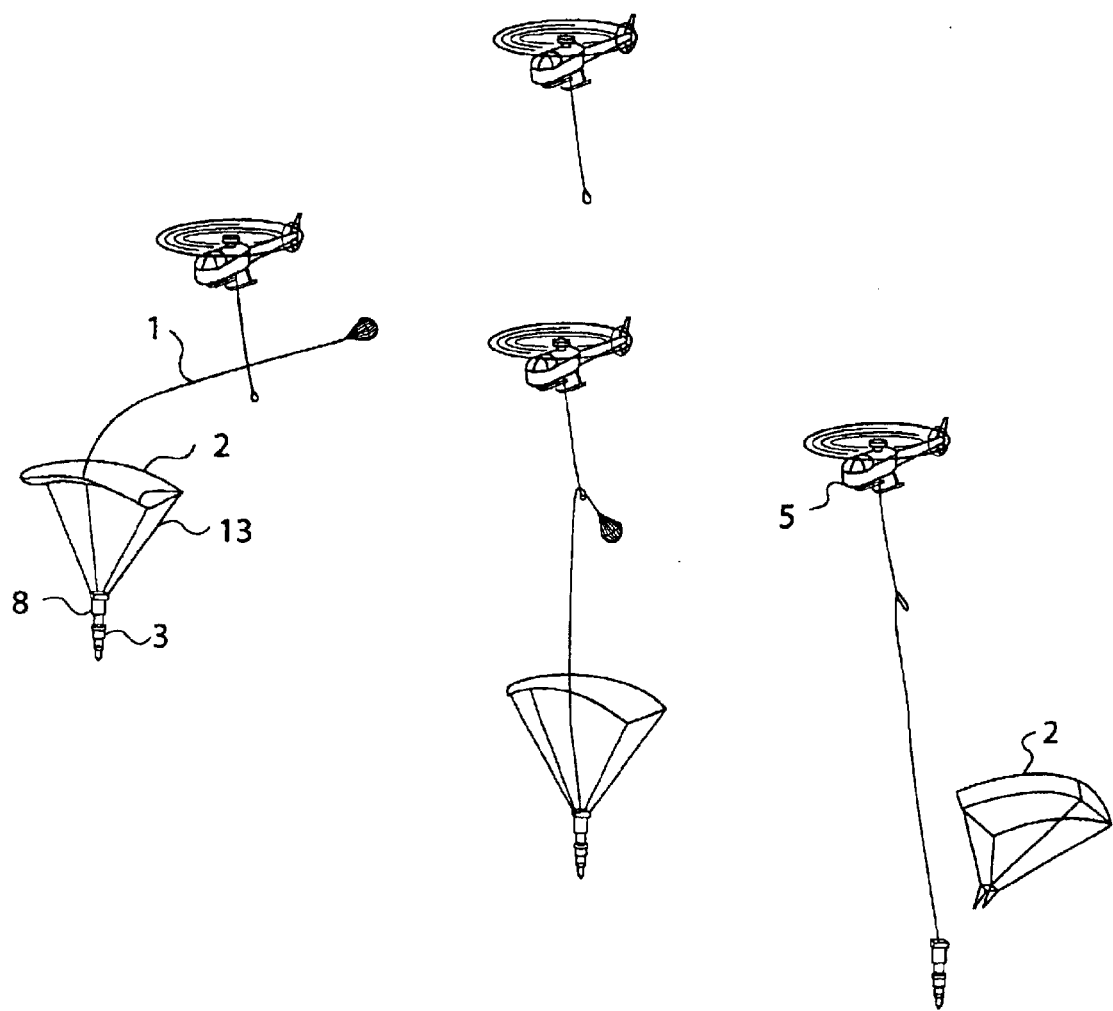
FIG. 2 illustrates the case of the parafoil being cut away after capture of the payload.
Figure 7:
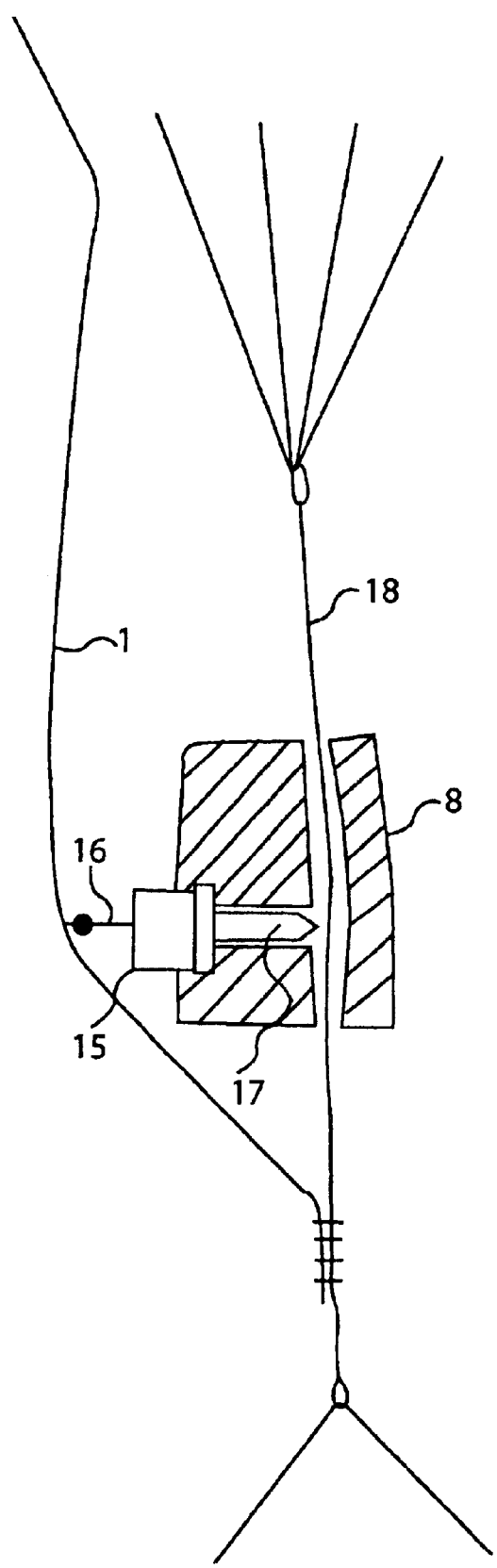
FIG. 7 is a diagram of a line cutter mechanism that applies to FIG. 2.

In FIG. 2 the aft-trailing line 1 is attached to the payload 3 and situated to extend upward and over the leading edge of the parafoil canopy 2. The suspension lines 13 of the parafoil 2 are attached to** the payload 3 via cutaway connections at 8. After cutaway of the parafoil 2, the payload 3 is entirely supported by the helicopter 5 without the encumbrance of attachment to the parafoil 2 that has become detached. In FIG. 7 a typical cutaway mechanism 8 is diagrammed with seer 16, which when pulled by tension on the retrieval line 1 from helicopter lifting, sets off the firing of pyrotechnic gas cartridge 15 pushing blade 17 to cut the payload riser 18.

Figure 3:
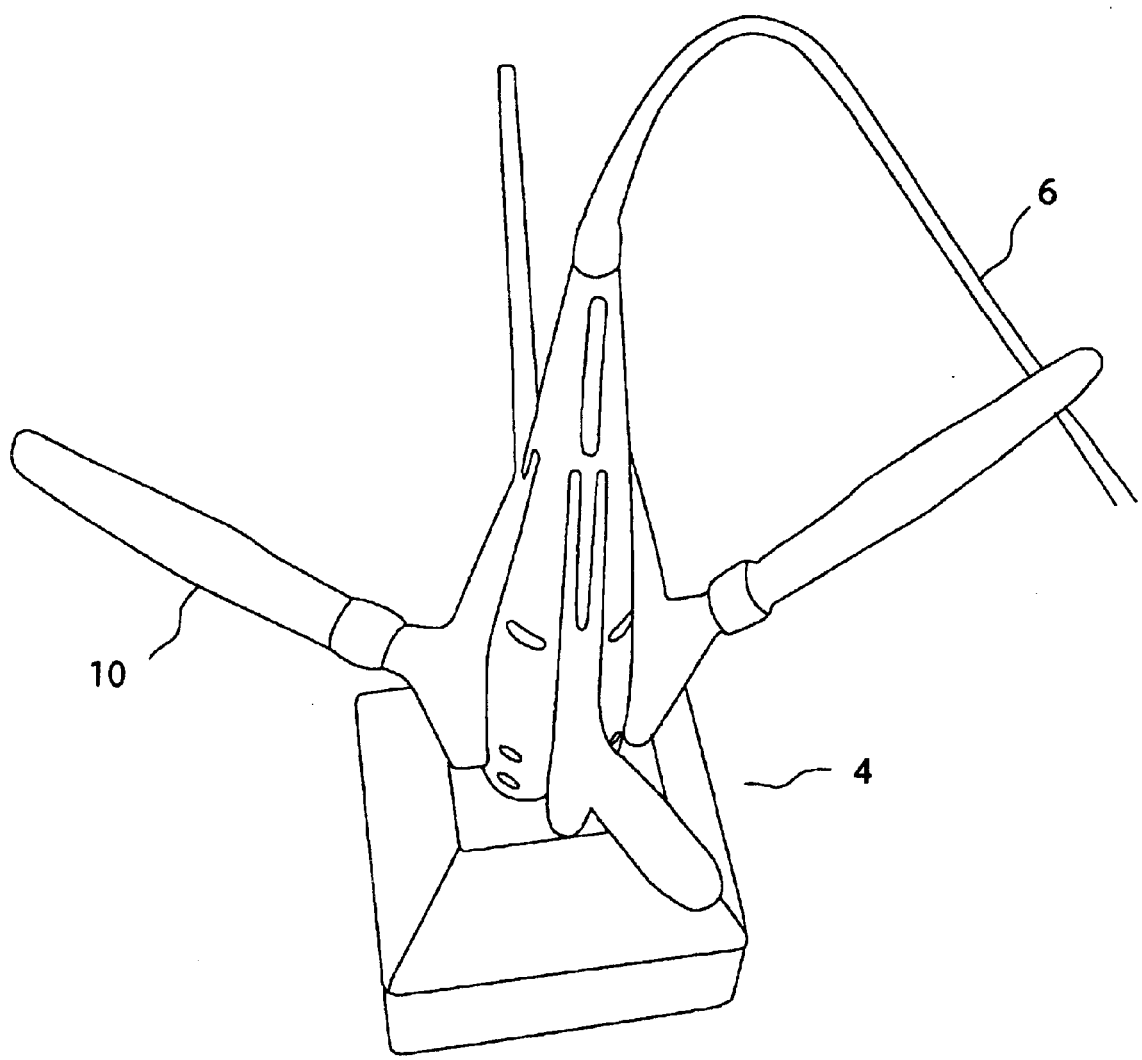
FIG. 3 shows the tines of a line-capturing hook.
Figure 4:
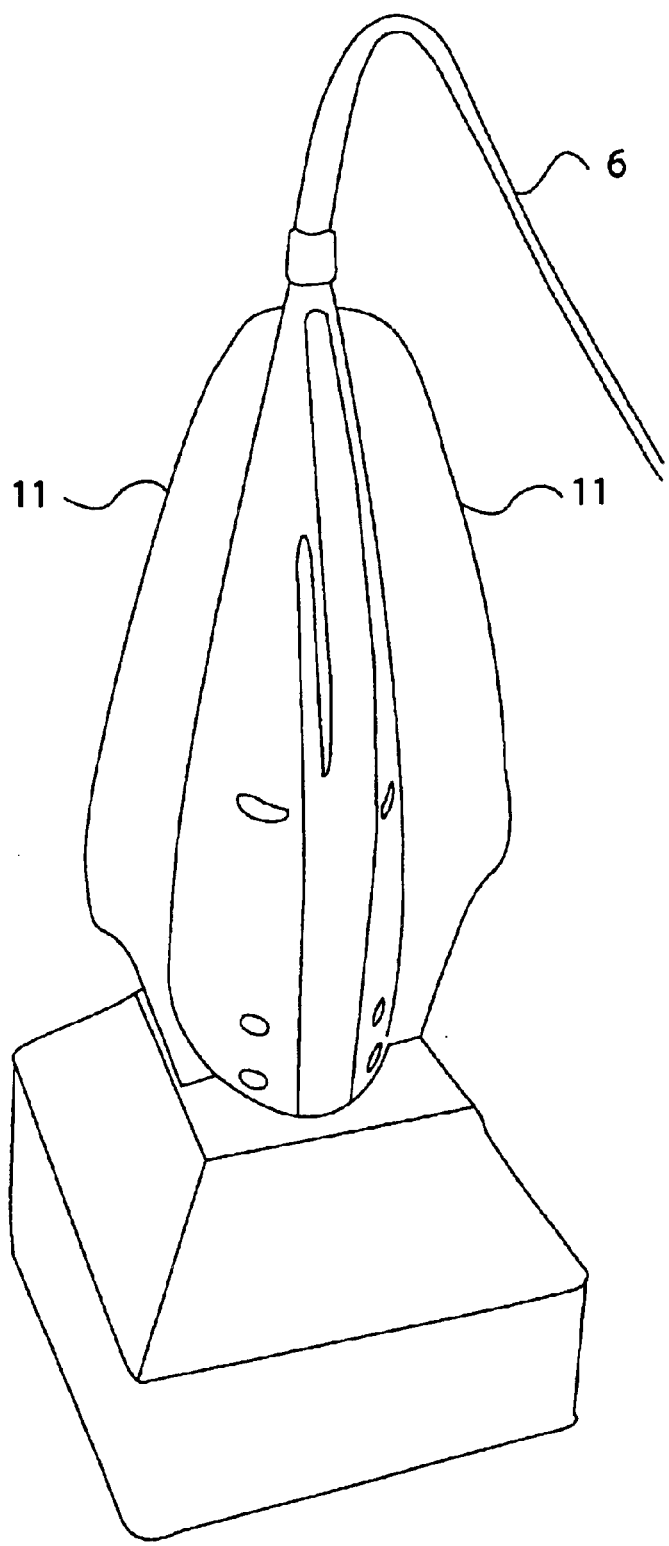
FIG. 4 shows a line-capturing hook with its actuated, clamping tines in the closed position.

FIG. 3 shows the detail of a line-capturing cargo hook 4 with its multiple, fixed tines 10. FIG. 4 shows a different line-capturing hook 4 with clamping tines 11, those tines 11 in the clamped position.

Figure 5:
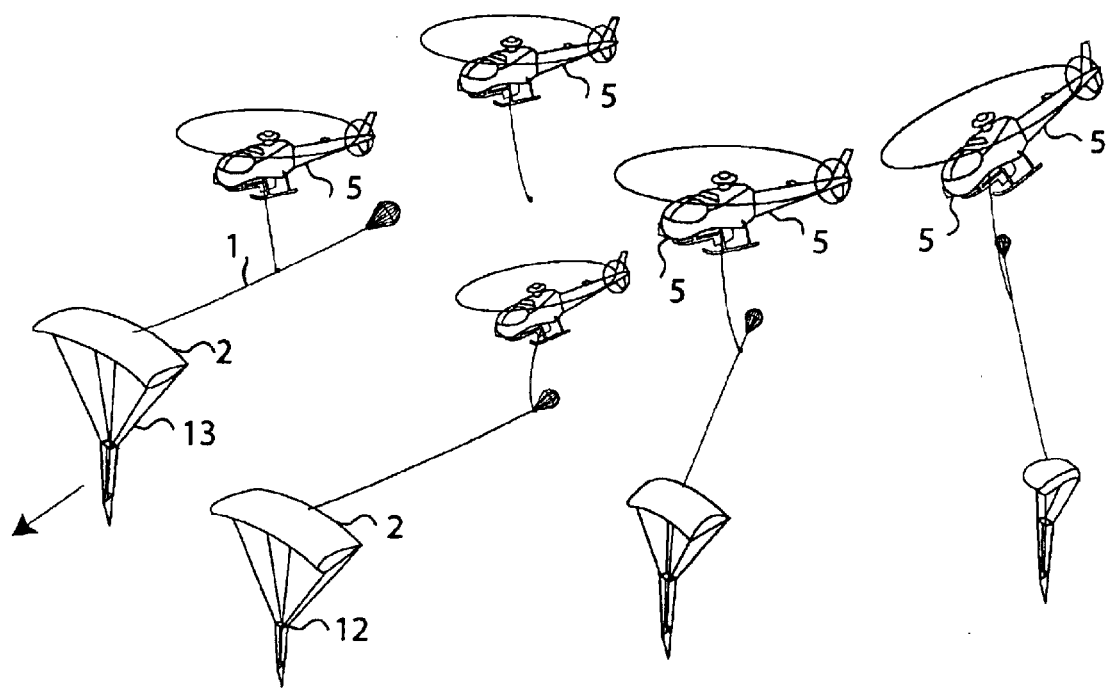
FIG. 5 illustrates the use of a slider assembly to collapse the suspension lines of the parafoil.

In FIG. 5 is seen the functioning of a load-carrying parafoil 2 equipped with a slider assembly 12 that is pulled upward gathering the suspension lines 13 and collapsing the parafoil canopy 2 for easier transport by the helicopter. Slider 12 is located at the lower end of the suspension lines 13. The helicopter 5 initially engages the aft-trailing line 1 and then moves directly above the parafoil 2 where it pulls the slider assembly 12 up via the trailing line 1. The aft-trailing line 1 runs vertically through the center of canopy 2.

Figure 8:
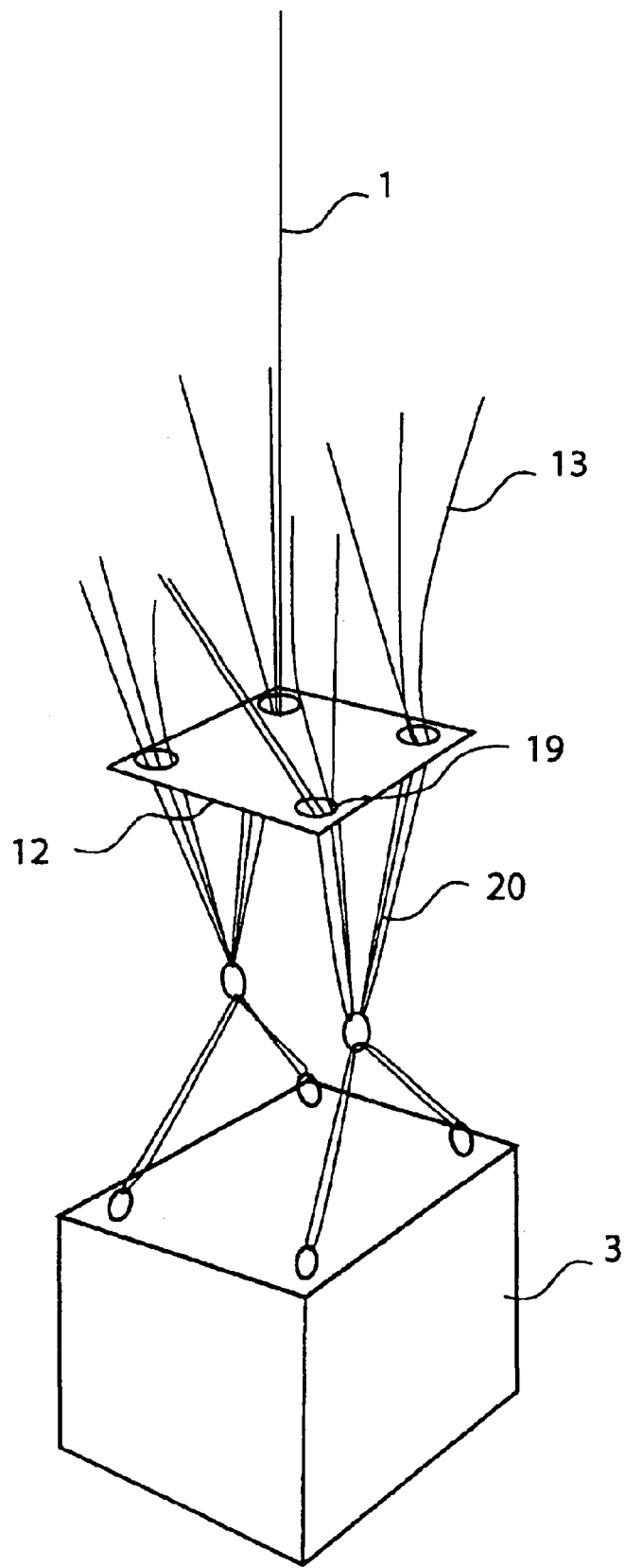
FIG. 8 shows detail of the slider assembly of FIG. 5.

FIG. 8 shows a closer view of the slider assembly 12 and its attachment to the aft-trailing line 1. The webbing-reinforced fabric panel 12, with its grommets, is the assembly through which the suspension lines 13 are routed.

Figure 6:
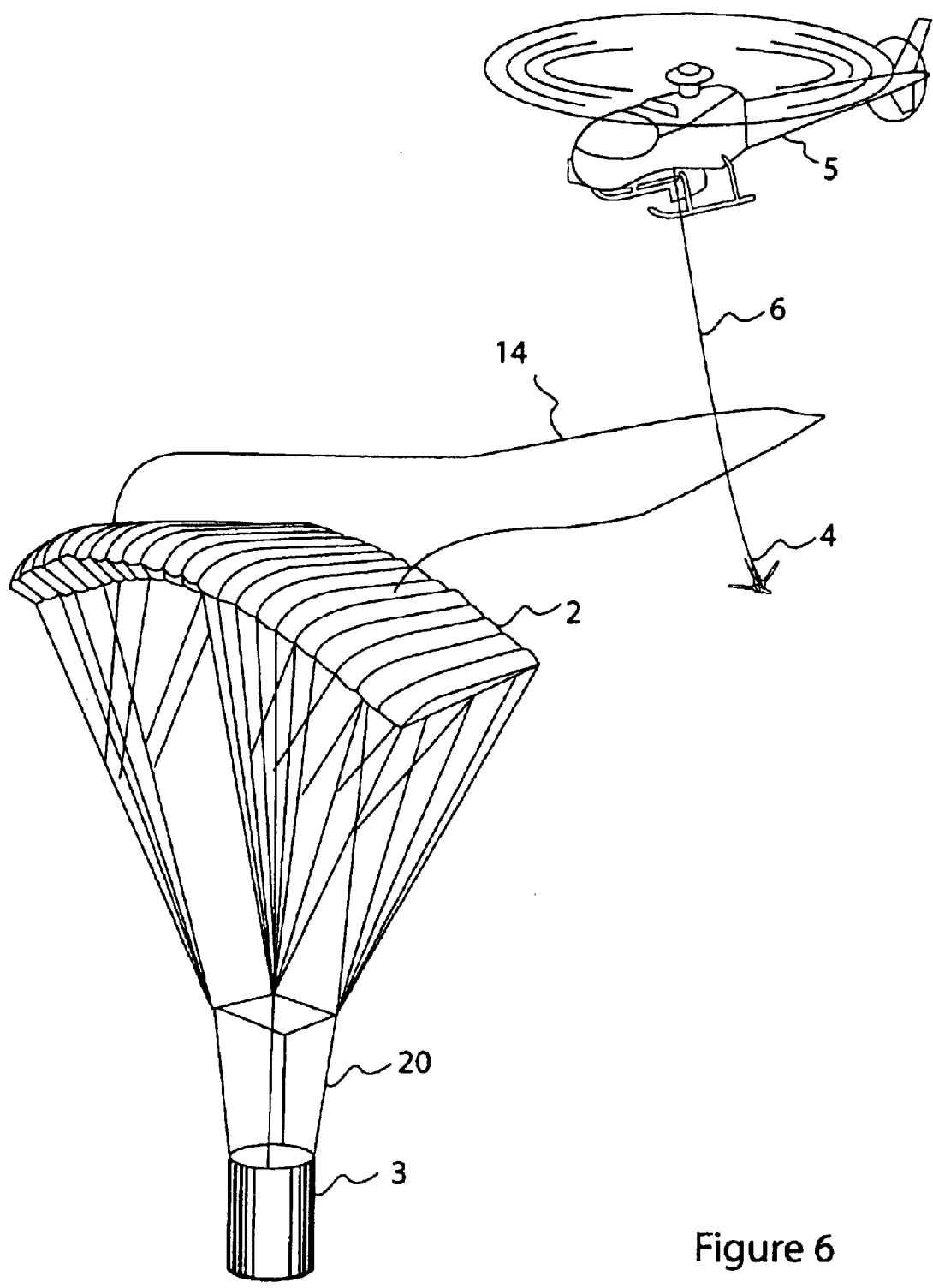
FIG. 6 illustrates the use of a trailing loop of line from the parafoil.

In FIG. 6 the aft-trailing line 14 for capture of the parafoil 2 by the hook 4 is fashioned as a loop. This allows capture by hook 4 that is not necessarily of a clamping design.

The trailing loop is one example of the alternate configuration for the retrieval line. A number of other configurations are possible within this invention.

Two methods for reducing or eliminating parafoil drag after capture of the load are described: (1) collapsing the parafoil by pulling up the slider and (2) releasing the parafoil with a cutter. A number of variations are possible within this invention that accomplish reducing parafoil drag after engagement and load transfer to a retrieval line 6.

I claim:

1. A mid-air retrieval system including a payload; a parafoil; said parafoil comprising a canopy, multiple suspension lines and multiple payload risers; said canopy having a leading edge and a trailing edge; each said suspension line having two ends; each said payload riser having two ends; each said first suspension line end being attached to said canopy; each said second suspension line end being attached to said first payload riser end; each said second payload riser end being attached to said payload; a retrieval-line attached to said parafoil; a helicopter; a load-line having two ends; said first load-line end attached to said helicopter at a provided external cargo hook; said load line second end being attached to an engagement hook; said helicopter being flown toward said parafoil, said parafoil in gliding flight, supporting said payload and trailing said retrieval-line; said helicopter then engaging said retrieval line with said engagement hook; said helicopter then flying forward and upward until said payload is suspended under said helicopter, and said trailing retrieval line can have two ends; the first said retrieval-line end being attached to the said first ends of said payload risers; the second said retrieval-line end being attached to a drogue parachute; and said retrieval line being routed from said first end upward to said leading edge of said canopy, over the top surface of said canopy, and trailing aft, stabilized by said drogue parachute, the invention comprising:

said trailing retrieval line having two ends; the first said retrieval-line end being attached to said payload risers at locations between said first end and said second end; cutter devices being attached to each said payload riser above the locations of said retrieval line attachment to said payload risers; said cutter devices being triggered by increasing tension on said retrieval line; said cutters severing said payload risers when triggered; the second said retrieval-line end being attached to a drogue parachute; and said retrieval line being routed from said first end upward to said leading edge of said canopy, over the top surface of said canopy, and trailing aft, stabilized by said drogue parachute.

2. The mid-air retrieval system of claim 1 in which said engagement hook has multiple tines that are actuated by remote control to facilitate engagement with said retrieval line by clamping firmly to said retrieval line.

3. The mid-air retrieval system of claim 1 in which said parafoil also includes a slider assembly, said slider assembly comprising: multiple grommets set in a fabric panel reinforced by webbing; said suspension lines each being routed through one of said grommets; said slider assembly being located near said second ends of said suspension lines during gliding flight; said retrieval line attached to said slider; said slider moving upward as the helicopter pulls upward on said retrieval line; said upward movement of the slider assembly serving to collapse said canopy and to facilitate smooth load transfer of the payload weight from the parafoil to the helicopter; said retrieval line proceeding centrally upward through said suspension lines and through a hole in the center of said parafoil.

* * * * *